(12) United States Patent
Cronmiller et al.

(10) Patent No.: US 6,297,978 B1
(45) Date of Patent: Oct. 2, 2001

(54) BYPASS RECTIFIER CONNECTION FOR ALTERNATOR TRANSITION LOCOMOTIVES

(75) Inventors: Robert E. Cronmiller; Ajith Kuttannair Kumar, both of Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/710,972

(22) Filed: Nov. 9, 2000

(51) Int. Cl.[7] .................................................. H02M 7/00
(52) U.S. Cl. ............................................. 363/67; 363/69
(58) Field of Search ................................. 363/67, 68, 69, 363/70

(56) References Cited

U.S. PATENT DOCUMENTS

| | | | |
|---|---|---|---|
| 3,932,765 | * 1/1976 | Townshend | 307/149 |
| 4,009,431 | 2/1977 | Johnson | 322/7 |
| 4,138,706 | * 2/1979 | Johnson et al. | 361/42 |
| 4,328,427 | 5/1982 | Bond | 290/3 |
| 4,339,704 | 7/1982 | McSparran et al. | 322/90 |
| 4,866,591 | * 9/1989 | Cook et al. | 363/67 |
| 5,894,414 | * 4/1999 | Jiang | 363/65 |

* cited by examiner

*Primary Examiner*—Peter S. Wong
*Assistant Examiner*—Bao Q. Vu
(74) *Attorney, Agent, or Firm*—Cantor Colburn LLP

(57) ABSTRACT

A series-parallel rectifier system and methodology, employing multiple parallel rectification paths is disclosed. The system includes a dual winding AC power supply and a rectifier apparatus coupled to the AC power supply. The rectifier apparatus is comprised of rectifier legs interconnected in a parallel circuit relationship, where each leg comprises several rectifiers including a connection in series and oriented to conduct current from a negative DC bus to a positive DC bus. Bypass legs comprising two rectifiers including a connection in series and oriented so as to conduct current from said negative DC bus to said positive DC bus are added in place of redundant rectifier legs and interconnected with the AC power supply.

24 Claims, 2 Drawing Sheets

BYPASS RECTIFIER CONNECTION FOR ALTERNATOR TRANSITION LOCOMOTIVES

BACKGROUND

Propulsion systems for traction vehicles such as locomotives commonly use a diesel engine prime mover to drive electric generating means for supplying energy to a plurality of direct current (DC) traction motors. The generating means typically comprises a 3-phase dual output alternator where each output comprises three phase windings interconnected in a 3-phase star configuration. The alternator voltages are rectified and applied to relatively positive and negative DC buses between which the respective pairs of motors which are generally connected in parallel.

Referring now to FIG. 1, which depicts a typical series-parallel alternator-rectifier system 10 comprising a dual winding AC power supply (e.g. alternator) 200 interconnected with a rectifier assembly 14 including series-parallel switches 46 and 48. The three different phases of the first set of windings 210 are respectively identified as 222, 224, and 226, which may typically represent what is commonly termed as phases A, B, and C respectively. Likewise, the three different phases of the second set of windings 220 are identified as 212, 214, and 216, which again, may typically represent what is commonly termed as phases A prime, B prime, and C prime respectively for the second set of windings 220.

The rectifier assembly 14 is formed by an array of rectifiers or rectifiers, which are interconnected and arranged between the dual winding AC power supply 200 and the positive DC bus 100p and negative DC bus 100n. In FIG. 1, the rectifier assembly 14 has two series-parallel switches 46 and 48 and three primary legs connected in parallel circuit relationship between the DC buses. Each leg of the three primary legs comprises a four rectifiers (e.g. diodes) connected in series with one another and oriented to conduct current in a direction from negative DC bus 100n to positive DC bus 100p. A first primary leg 120 comprises a first rectifier 22, a second rectifier 24, a third rectifier 52, and a fourth rectifier 54 connected in series with one another and oriented to conduct current in a direction from negative DC bus 100n to positive DC bus 100p. The second primary leg 130 comprises a first rectifier 30, a second rectifier 32, a third rectifier 60, and a fourth rectifier 62 similarly connected and oriented. Finally, the third primary leg 140 also comprises a first rectifier 38, a second rectifier 40, a third rectifier 68, and a fourth rectifier 70 in the same connection and orientation.

The first set of windings 210 of the AC power supply 200 is connected to the respective primary legs of the rectifier assembly 14 by three lines 102, 104, and 106. Where line 102 connects at the junction of rectifiers 22 and 24 of the first primary leg, line 104 connects at the junction of rectifiers 30 and 32 of the second primary leg, and line 106 connects at the junction of rectifiers 38 and 40 of the third primary leg. Similarly, the second set of windings 220 of the dual winding AC power supply 200 is correspondingly connected to the respective primary legs of the rectifier assembly 14 by three lines 112, 114, and 116. Where line 112 connects at the junction of rectifiers 52 and 54 of the first primary leg, line 114 connects at the junction of rectifiers 60 and 62 of the second primary leg, and line 116 connects at the junction of rectifiers 68 and 70 of the third primary leg. Thus, the two sets of windings 210 and 220 are effectively connected in parallel between the DC buses 100n and 100p with the series-parallel switches 46 and 48 open.

Since each of these two paths includes passing through the same number of rectifiers and since the voltage of phase 212 has the same instantaneous magnitude and polarity as the voltage of phase 222, the parallel paths share current substantially equally. It is noteworthy the current passes through at least four rectifiers to complete the circuit. Note also, that each of the outboard rectifiers 22, 30, 38, 54, 62, and 70 now have to conduct twice as much current as each of the inboard rectifiers 24, 32, 40, 52, 60, and 68. Therefore, the current rating of these rectifiers is commonly based on the higher duty of the outboard rectifiers, or the rectifier assembly 14 should be physically arranged so that the outboard rectifiers receive preferential cooling.

In addition, the described arrangement of the rectifier assemblies may be supplemented by adding rectifiers or rectifier legs to the rectifier assembly 14. Each supplemental leg similarly connected and conducting current in a similar fashion as described above. For example, a supplemental leg in parallel to each of the legs described above. Such a configuration is depicted in FIG. 1 with first, second and third supplemental legs 122, 132, and 142 respectively. Those skilled in the art will appreciate that such a parallel configuration as described provides effectively double the current rectification capability for the overall system thereby allowing for the use of reduced rating components (e.g., lower current rating rectifiers) or for higher current capability negative DC bus 100n and 100p.

The above described configuration results in the certain rectifiers of each leg being required to conduct more current than others in the leg. Further, in a typical configuration the individual rectifiers may very well be part of a larger package including several individual rectifiers and further may even include interconnections between the individual elements within the package. In consideration of such a typical application, some rectifiers is such a package may be required to conduct more current than others, while others may see varying voltage constraints. This type of configuration forces under-utilization of some components to satisfy the rating requirements of others. It is therefore seen to be desirable to have a rectifier assembly, configured to reduce or eliminate under-utilized components, thereby providing maximal capability within a particular rectifier's ratings.

SUMMARY OF THE INVENTION

An exemplary embodiment is disclosed for a series-parallel rectifier system and methodology, employing multiple parallel rectification paths. The system includes a dual winding AC power supply with phase matched alternating voltages and a rectifier apparatus coupled to the AC power supply. The rectifier apparatus comprises a series-parallel switches and rectifier legs interconnected in a parallel circuit relationship, with each leg comprising several rectifiers connected in series and oriented to conduct current from a negative DC bus to a positive DC bus. Bypass legs comprising two rectifiers connected in series and oriented so as to conduct current from said negative DC bus to said positive DC bus are added in place of redundant rectifier legs and interconnected with the AC power supply.

An alternative embodiment is disclosed for a series-parallel rectifier system and methodology, employing multiple parallel rectification paths. The system includes a dual winding AC power supply with phase matched alternating voltages and a rectifier apparatus coupled to the AC power supply. The rectifier apparatus comprises series-parallel switches and rectifier legs interconnected in a parallel circuit relationship, with each leg comprising several rectifiers connected in series and oriented to conduct current from a negative DC bus to a positive DC bus. The rectifier legs are interconnected with the AC power supply.

BRIEF DESCRIPTION OF THE DRAWINGS

Referring now to the drawings wherein like elements are numbered alike in the several FIGS.

DETAILED DESCRIPTION OF THE INVENTION

The present invention may be utilized in various types of alternating current (AC) induction motor powered vehicles such as, for example, transit cars and locomotives. A preferred embodiment of the invention, by way of illustration is described herein as it may be applied to a locomotive. While a preferred embodiment is shown and described, it will be appreciated by those skilled in the art that the invention is not limited to locomotives but may also be applied to alternator-rectifier combinations and devices powered by such.

Figure 2:
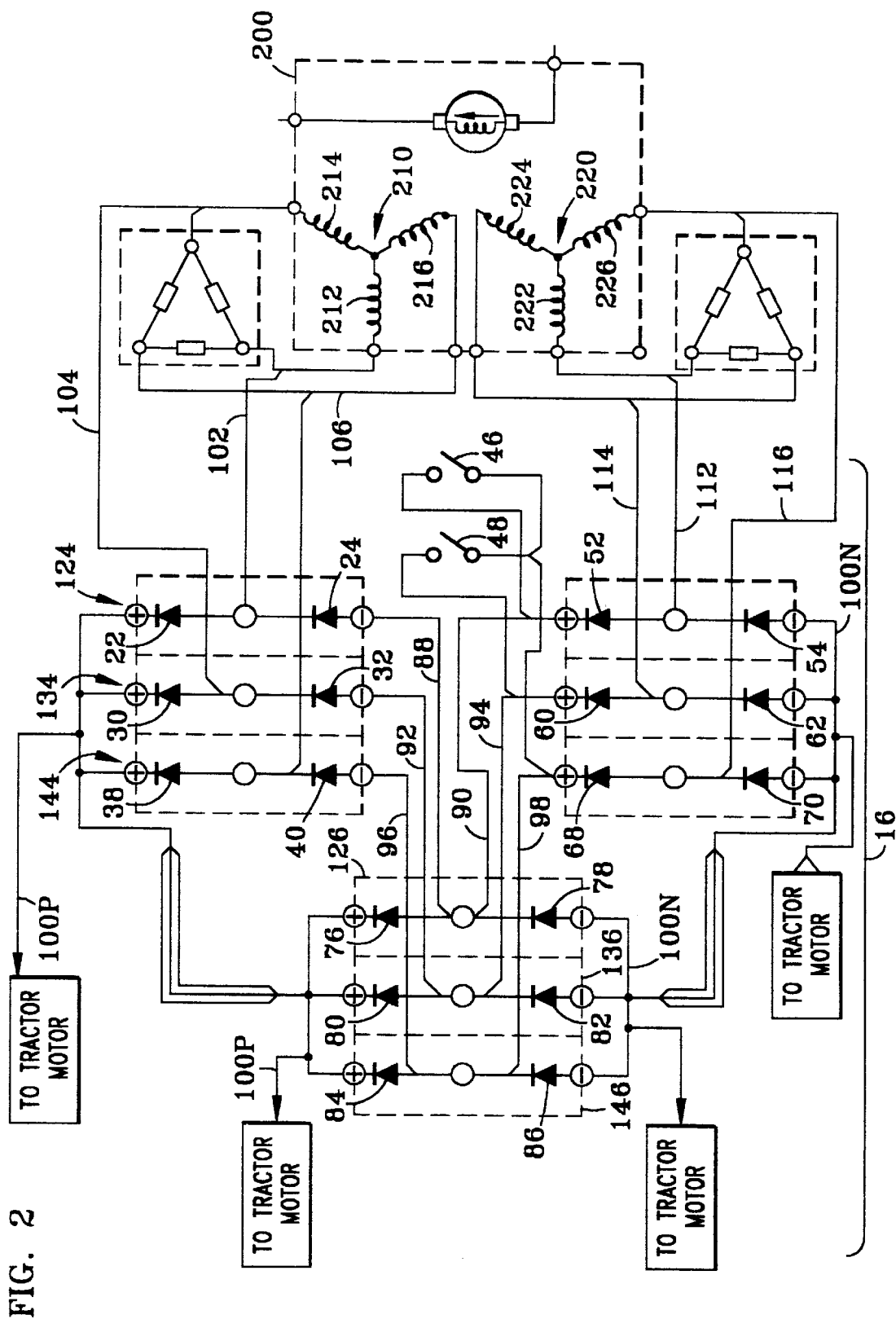
FIG. 2 depicts a schematic of an embodiment of bypass rectifier rectifier apparatus.

FIG. 2. depicts an AC power supply 200, typically a dual winding alternator, interconnected with a rectifier apparatus 16. Like above, the three different phases of the first set of windings 210 are identified as 212, 214, and 216 respectively, and the three different phases of the second set of windings 220 are identified as 222, 224, and 226 respectively.

The rectifier apparatus 16 is formed by an array of rectifiers, commonly diodes, which are interconnected and arranged between the AC power supply 200 and the DC buses 100p and 100n. The rectifier apparatus 16 includes series-parallel switches 46 and 48 and has three main legs connected in parallel circuit relationship between the DC buses. Each leg of the three main legs comprises a four rectifiers connected in series with one another and oriented to conduct current in a direction from negative DC bus 100n to positive DC bus 100p. A first main leg 124 of the three legs comprises a first rectifier 22, a second rectifier 24, line 88, line 90, a third rectifier 52, and a fourth rectifier 54 conductively connected in series with one another and oriented to conduct current in a direction from negative DC bus 100n to positive DC bus 100p. More particularly, the fourth rectifier 54, having its anode connected to negative DC bus 100n, while its cathode is connected to the anode of the third rectifier 52 and so on, ultimately terminating with the cathode of the first rectifier being connected to positive DC bus 100p. The second main leg 134 comprises a first rectifier 30, a second rectifier 32, line 92, line 94, a third rectifier 60, and a fourth rectifier 62 similarly connected and oriented. Finally, the third main leg 144 also comprises a first rectifier 38, a second rectifier 40, line 96, line 98, a third rectifier 68, and a fourth rectifier 70 in the same connection and orientation.

The first set of windings 210 of the dual winding AC power supply 200 is connected to the respective main legs of the rectifier apparatus 16 by three lines 102, 104, and 106. Where line 102 connects at the junction of rectifiers 22 and 24 of the first main leg, line 104 connects at the junction of rectifiers 30 and 32 of the second main leg, and line 106 connects at the junction of rectifiers 38 and 40 of the third main leg. Similarly, the second set of windings 220 of the dual winding AC power supply is correspondingly connected to the respective main legs of the rectifier apparatus 16 by three lines 112, 114, and 116. Where line 112 connects at the junction of rectifiers 52 and 54 of the first main leg, line 114 connects at the junction of rectifiers 60 and 62 of the second main leg, and line 116 connects at the junction of rectifiers 68 and 70 of the third main leg. Thus, the two sets of windings 210 and 220 are effectively connected in parallel between the DC buses 100n and 100p.

Figure 1:
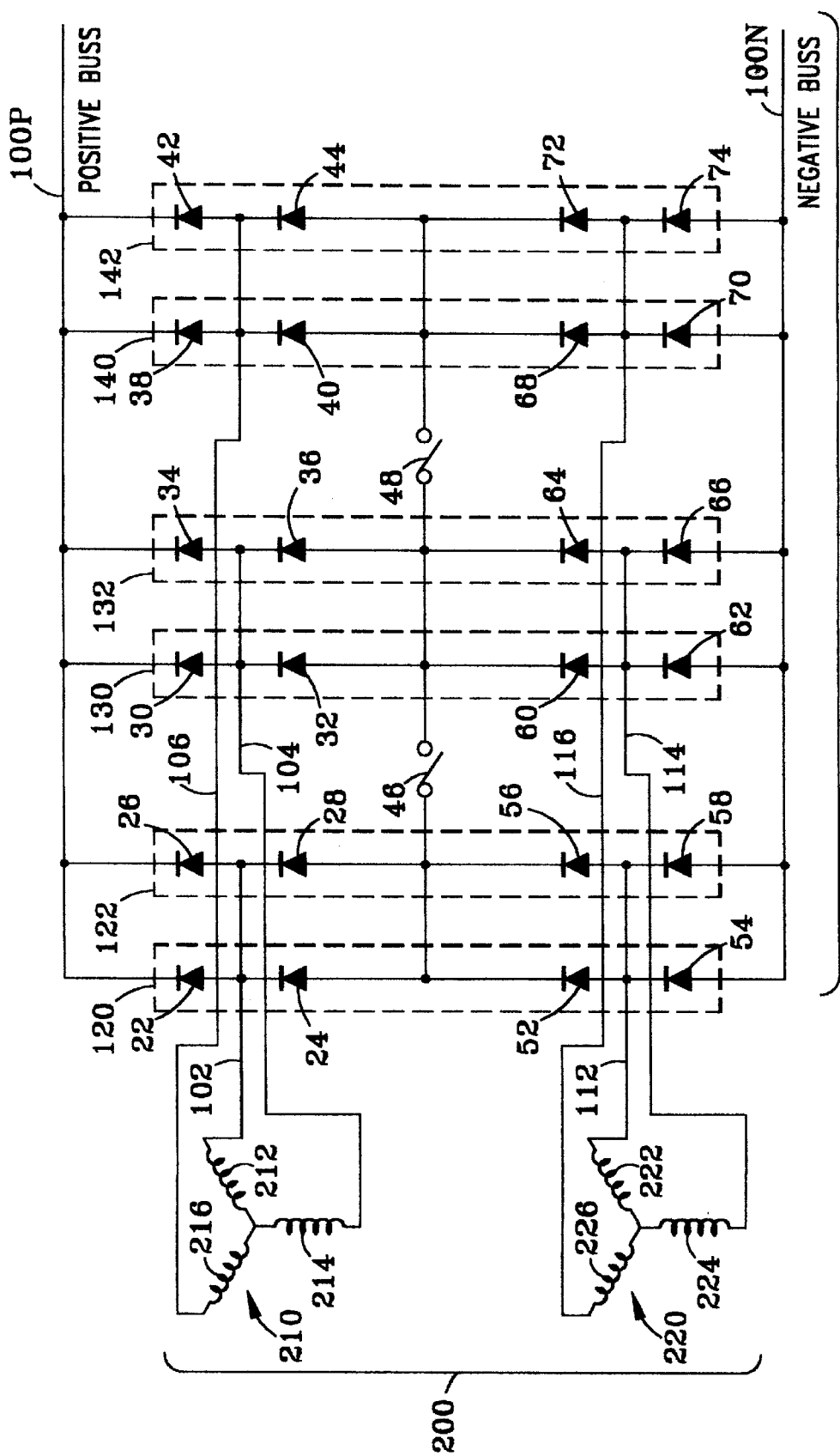
FIG. 1 depicts a schematic of an alternator and rectifier assembly.

In addition, the described arrangement of the rectifier apparatus 16 may be supplemented by the addition of rectifiers or rectifier legs to the rectifier apparatus 16. Each supplemental leg similarly connected and conducting current in a similar fashion as described earlier. For example, FIG. 1 depicts the first, second and third supplemental legs 122, 132, and 142 respectively in parallel to each of the legs 120,130, and 140.

An embodiment of the invention is depicted in FIG. 2 highlighting the rectifier apparatus 16, where the paralleled supplemental legs, 122, 132, and 142 (FIG. 1) are replaced by an alternate set of paralleled legs, termed bypass legs. Where the first bypass leg 126 comprises a first rectifier 76, and a second rectifier 78 conductively connected in series with one another, to negative DC bus 100n to positive DC bus 100p, and oriented to conduct current in a direction from negative DC bus 100n to positive DC bus 100p. More particularly, the second rectifier 78, having its anode connected to negative DC bus 100n, while its cathode is connected to the anode of the first rectifier 76 and its cathode being connected to positive DC bus 100p. In addition, the junction of the first rectifier 76 and the second rectifier 78 of the first bypass leg 126 is conductively connected to the anode of the second rectifier 22 of the first main leg 124 via line 88 and the cathode of the third rectifier 52 of the first main leg 124 via line 90. The second bypass leg 136 comprises a first rectifier 80, and a second rectifier 82 conductively connected in series with one another, to the negative DC bus 100n to 100p, and oriented to conduct current in a direction from negative DC bus loon to positive DC bus 100p. Likewise, the second rectifier 82, of the second bypass leg 136, having its anode connected to negative DC bus 100n, while its cathode is connected to the anode of the first rectifier 80 and its cathode being connected to positive DC bus 100p. In addition, the junction of the first rectifier 80 and the second rectifier 82 is conductively connected to the anode of the second rectifier 32 of the second main leg 134 via line 92 and third rectifier 60 of the second main leg 134 via line 94. Similarly, the third bypass leg 146 comprises a first rectifier 84, and a second rectifier 86 conductively connected in series with one another, to the negative DC bus 100n to 100p, and oriented to conduct current in a direction from negative DC bus 100n to positive DC bus 100p. Again, the second rectifier 86, of the second bypass leg 136, having its anode connected to negative DC bus 100n, while its cathode is connected to the anode of the first rectifier 84 and its cathode being connected to positive DC bus 100p. Similarly, the junction of the first rectifier 84 and the second rectifier 86 is conductively connected to the anode of the second rectifier 40 of the third main leg 144 via line 96 and the cathode of third rectifier 68 of the third main leg 144 via line 98.

An embodiment as described, yields a configuration of a rectifier apparatus 16 where the main legs 124, 134, and 144 coupled with the bypass legs 126, 136, and 146 (FIG. 2) provide effectively the same rectification and current capability as the paralleled leg configuration with the combination of legs 120, 130, and 140 with 122, 132, and 142 (FIG.

1). However, the bypass legs 126, 136, and 146 utilize two less rectifiers per leg than the typical configuration. Moreover, such a configuration amounts to a 25 percent reduction in rectifier component count as well as a commensurate reduction in the cumulative power dissipated by the rectifier apparatus 16.

The significance of such improvements may be further illustrated by considering the currents in the respective windings of the AC power supply 200 and through the rectifier legs under particular conditions. Consider again, the condition when the potential at the terminal of the phase 212 (and 222) winding is at its positive peak relative to the potential at the terminal of the phase 216 (and 226) winding and the potential at the terminal of the phase 214 (and 224) winding respectively. Under these conditions, for the phase 222, source current flows out of line 112 through the first rectifier 52 of the first main leg 124 through line 90. The source current continues through the first third rectifier 76 of the first bypass leg, to combine with source current from the phase 212 and through the first rectifier 22 of the first main leg 124 to the relatively positive DC bus 100p. Having passed through the load circuit the current returns from the negative DC bus 10on splits four ways: (1) through the fourth rectifier 62 of the second main leg 134 to line 114 and into phase 224 of the second set of windings 220; (2) through the fourth rectifier 70 of the third leg 140 to line 116 and into phase 226 of the second set of windings 220; (3) through the second rectifier 82 of the second bypass leg 134, through line 92, through the second rectifier 32 of the second bypass leg 136 onto line 104 and to phase 214 of the first set of windings 210; and (4) through the second rectifier 86 of the third bypass leg 144, through line 96, through the second rectifier 40 of the third main leg 144 onto line 106 to phase 216 of the first set of windings 210. Each of these paths includes passing through the same number of rectifiers and since the voltage of the phase 212 has the same instantaneous magnitude and polarity as the voltage of the phase 222; the parallel paths share current substantially equally. However, unlike in the typical rectifier assembly 14 (FIG. 1), the path includes conduction through three rectifiers rather than four. This results in a reduction of the total rectifier voltage drop per circuit path by one. It will be appreciated that such an embodiment of a rectifier apparatus 16 would also provide of a more efficient voltage generation of the buses 100n and 100p via the elimination of the losses associated with the previously encountered fourth rectifier voltage drop.

It is noteworthy to consider that the bypass legs 126–146 may not necessarily be collocated with the main legs 124, 134, and 144. Such an arrangement may give rise to dynamic effects to the paths taken by the current through the rectifier apparatus. As the separation between elements of the rectifier apparatus 16 increases, or as the current magnitudes increase, such dynamic effects due to cabling, or interconnections may become more pronounced. The embodiment as described above employs interconnection lines 88–98 in a topology disposed in a fashion to ensure that the inductive reactance presented by the rectifier apparatus 16 to both the first set of windings 210 and second set of windings 220 is nearly equivalent. Such an approach, as embodied, ensures that the bypass legs 126, 136, and 146 share the total current through the rectifier apparatus 16 equally with the main legs 124, 134, and 144. By utilizing an appropriately balanced topology for the alternator rectifier circuit, the loop impedances encountered by both winding sets 210 and 220 will be relatively equal. Therefore, maintaining the current relatively equal in every leg 124–146 for equivalent voltages from each of the windings of the AC power supply 200.

It is of further merit to note that, in the disclosed embodiment as distinguished from a typical rectifier assembly 14 (FIG. 1), each of the rectifiers and the circuit interconnection is configured to conduct substantially the same amount of current. Thereby, providing for selection of rectifiers all having the same rating, and minimizing the under-utilization of components in the rectifier apparatus 16. It is of further significance to recognize that such an embodiment reduces the required cooling by reducing dissipated power but also eliminates the potential requirement for preferential cooling of higher duty rectifiers.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A series-parallel alternator-rectifier system, with multiple parallel rectification paths, the series-parallel alternator-rectifier system comprising:

an AC power supply comprising at least a first set of windings and a second set of windings arranged such that in-phase alternating voltages are respectively generated therein;

a positive DC bus and a negative DC bus;

a rectifier apparatus coupled to said AC power supply including series parallel switches and at least a first main leg and a second main leg interconnected in a parallel circuit relationship, each main leg comprising a first rectifier, a second rectifier, a third rectifier, and a fourth rectifier with a connection in series from said negative DC bus to said positive DC bus and oriented so as to conduct current from said negative DC bus to said positive DC bus;

a first bypass leg, comprising a first rectifier and a second rectifier with a connection in series from said negative DC bus to said positive DC bus and oriented so as to conduct current from said negative DC bus to said positive DC bus;

wherein said rectifier apparatus is coupled to said AC power supply such that said first set of windings includes a connection between a point between said first rectifier and said second rectifier of said first main leg and a point between said first rectifier and said second rectifier of said second main leg, said second winding includes a connection between a point between said third rectifier and said fourth rectifier of said first main leg and a point between said third rectifier and said fourth rectifier of said second main leg; and a junction of said first rectifier and said second rectifier of said first bypass leg includes a connection to a junction of said second rectifier and said third rectifier of said first main leg.

2. The system of claim 1 wherein said connection is a topological arrangement that accounts for inductive effects of each said connection.

3. The system of claim 1 further including a second said bypass leg comprises a first rectifier and a second rectifier with a connection in series from said negative DC bus to said positive DC bus and oriented so as to conduct current from said negative DC bus to said positive DC bus, and wherein a junction of said first rectifier and said second rectifier of said second bypass leg includes a connection to a junction of said second rectifier and said third rectifier of said second main leg.

4. The system of claim 3 wherein said connection is a topological arrangement that accounts for inductive effects of each said connection.

5. The system of claim 1 further including a third main leg interconnected in said parallel circuit relationship with said first main leg and said second main leg.

6. The system of claim 5 further including a third bypass leg, comprising a first rectifier and a second rectifier with a connection in series from said negative DC bus to said positive DC bus and oriented so as to conduct current from said negative DC bus to said positive DC bus and a junction of said first rectifier and said second rectifier of said third bypass leg includes a connection to a junction of said second rectifier and said third rectifier of said third main leg.

7. The system of claim 6 wherein said connection is a topological arrangement that accounts for inductive effects of each said connection.

8. The system of claim 5 wherein said AC power supply comprises a dual winding three-phase alternator wherein said first set of windings and a second set of windings, are arranged such that alternating voltages generated in the respective windings of said first set of windings will be substantially in phase with alternating voltages generated in the corresponding windings of said second set of windings.

9. The system of claim 5 wherein said first set of windings includes connections to said first main leg, said second main leg, and said third main leg at points between said first rectifier and saod second rectifier respectively thereof, and said second set of windings includes a connection to said first main leg, said second main leg, and said third main leg of said rectifier apparatus at points between said third rectifier and said fourth rectifier respectively thereof.

10. The system of claim 9 further including a third bypass leg, comprising a first rectifier and a second rectifier with a connection in series from said negative DC bus to said positive DC bus and oriented so as to conduct current from said negative DC bus to said positive DC bus and a junction of said first rectifier and said second rectifier of said third bypass leg includes a connection to a junction of said second rectifier and said third rectifier of said third main leg.

11. The system of claim 10 wherein said connection is a topological arrangement that accounts for inductive effects of each said connection.

12. A series-parallel rectification method, with multiple parallel rectification paths, the series-parallel rectification method comprising:

generating in-phase alternating voltages with an AC power supply including a first set of windings and a second set windings;

rectifying said alternating voltages with a rectifier apparatus coupled to said AC power supply including series-parallel switches and at least a first main leg and a second main leg interconnected in a parallel circuit relationship, each main leg comprising a first rectifier, a second rectifier, a third rectifier and a fourth rectifier including a connection in series from a negative DC bus to a positive DC bus and oriented to conduct current from said negative DC bus to said positive DC bus; and supplementing said rectifier apparatus with a first bypass leg, comprising a first rectifier and a second rectifier including a connection in series from said negative DC bus to said positive DC bus and oriented to conduct current from said negative DC bus to said positive DC bus.

13. The method of claim 12 wherein said rectifier apparatus is coupled to said AC power supply such that said first set of windings includes a connection between a point between said first rectifier and said second rectifier of said first main leg and a point between said first rectifier and said second rectifier of said second main leg, said second winding includes a connection between a point between said third rectifier and said fourth rectifier of said first main leg and a point between said third rectifier and said fourth rectifier of said second main leg.

14. The method of claim 13 wherein a junction of said first rectifier and said second rectifier of said first bypass leg includes a connection to a junction of said second rectifier and said third rectifier of said first main leg.

15. The method of claim 14 wherein said connection is a topological arrangement that accounts for inductive effects of each said connection.

16. The method of claim 14 further including a second bypass leg comprising a first rectifier and a second rectifier with a connection in series from said negative DC bus to said positive DC bus and oriented to conduct current from said negative DC bus to said positive DC bus, and wherein a junction of said first rectifier and said second rectifier of said second bypass leg includes a connection to a junction of said second rectifier and said third rectifier of said second main leg.

17. The method of claim 16 wherein said connection is a topological arrangement that accounts for inductive effects of each said connection.

18. The method of claim 14 further including a third leg interconnected in said parallel circuit relationship with said first main leg and said second main leg.

19. The method of claim 18 further including supplementing said third main leg with a third bypass leg, comprising a first rectifier and a second rectifier with a connection in series from said negative DC bus to said positive DC bus and oriented so as to conduct current from said negative DC bus to said positive DC bus and a junction of said first rectifier and said second rectifier of said third bypass leg includes a connection to a junction of said second rectifier and said third rectifier of said third main leg.

20. The method of claim 19 wherein said connection is a topological arrangement that accounts for inductive effects of each said connection.

21. The method of claim 18 wherein said AC power supply is comprises a dual winding three-phase alternator including a first set of windings and a second set of windings arranged such that alternating voltages generated in the respective windings of said first set of windings will be substantially in phase with alternating voltages generated in the corresponding windings of said second set of windings.

22. The method of claim 21 wherein said first set of windings includes a connection to said first main leg, said second main leg, and said third main leg at points between said first rectifier and said second rectifier respectively thereof and said second set of windings includes a connection to said first main leg, said second main leg, and said third main leg at points between said third rectifier and said fourth rectifier respectively thereof.

23. The method of claim 22 further including supplementing said third main leg with a third bypass leg, comprising a first rectifier and a second rectifier, including a connection in series from said negative DC bus to said positive DC bus and oriented so as to conduct current from said negative DC bus to said positive DC bus and a junction of said first rectifier and said second rectifier of said third bypass leg includes a connection to a junction of said second rectifier and said third rectifier of said third main leg.

24. The method of claim 23 wherein said connection is a topological arrangement that accounts for inductive effects of each said connection.

\* \* \* \* \*